(12) United States Patent
Belin et al.

(10) Patent No.: US 9,000,092 B2
(45) Date of Patent: Apr. 7, 2015

(54) RUBBER COMPOSITION COMPRISING A BLOCKED MERCAPTOSILANE COUPLING AGENT

(75) Inventors: Laure Belin, Rlom (FR); Karine Longchambon, Beaumont (FR); José Carlos Araujo Da Silva, Pont du Chateau (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 145 days.

(21) Appl. No.: 13/141,206

(22) PCT Filed: Dec. 18, 2009

(86) PCT No.: PCT/EP2009/067550
§ 371 (c)(1),
(2), (4) Date: Aug. 2, 2011

(87) PCT Pub. No.: WO2010/072682
PCT Pub. Date: Jul. 1, 2010

(65) Prior Publication Data
US 2011/0306700 A1    Dec. 15, 2011

(30) Foreign Application Priority Data
Dec. 22, 2008    (FR) ...................... 08 58928

(51) Int. Cl.
| | | |
|---|---|---|
| *C08F 8/42* | (2006.01) | |
| *B60C 15/06* | (2006.01) | |
| *C08K 3/00* | (2006.01) | |
| *B60C 1/00* | (2006.01) | |
| *C08K 5/548* | (2006.01) | |

(52) U.S. Cl.
CPC ............. *C08K 3/0033* (2013.01); *B60C 1/0016* (2013.01); *C08K 5/548* (2013.01)

(58) Field of Classification Search
CPC ............ A61M 11/02; A61M 15/0026; A61M 15/009; A61M 2205/075; B65D 83/386
USPC .............................. 152/539; 525/54, 100, 105
See application file for complete search history.

(56) References Cited

U.S. PATENT DOCUMENTS

| | | | |
|---|---|---|---|
| 5,977,238 | A | 11/1999 | Labauze |
| 6,013,718 | A | 1/2000 | Cabioch et al. |
| 6,503,973 | B2 | 1/2003 | Robert et al. |
| 6,506,827 | B2 | 1/2003 | Nakano |
| 6,815,473 | B2 | 11/2004 | Robert et al. |
| 7,074,876 | B2 * | 7/2006 | Cruse et al. ...................... 528/44 |
| 7,934,528 | B2 * | 5/2011 | Amaddeo et al. ............. 152/539 |
| 2002/0115767 | A1 | 8/2002 | Cruse et al. |
| 2006/0089445 | A1 | 4/2006 | Gandon-Pain |
| 2006/0161015 | A1 | 7/2006 | Klockmann et al. |
| 2007/0142552 | A1 | 6/2007 | Silvi et al. |
| 2008/0306213 | A1 * | 12/2008 | Jiang et al. ................. 525/54.44 |

FOREIGN PATENT DOCUMENTS

| | | |
|---|---|---|
| EP | 1 127 909 A1 | 8/2001 |
| FR | 2 740 778 | 5/1997 |
| FR | 2 765 882 | 1/1999 |
| FR | 2 908 410 | 5/2008 |
| WO | WO 97/36724 A2 | 10/1997 |
| WO | WO 99/16600 A1 | 4/1999 |
| WO | WO 99/28376 A1 | 6/1999 |
| WO | WO 00/73372 A1 | 12/2000 |
| WO | WO 01/92402 A1 | 12/2001 |
| WO | WO 02/10269 A2 | 2/2002 |
| WO | WO 02/48256 A2 | 6/2002 |
| WO | WO 02/053634 A1 | 7/2002 |
| WO | WO 03/002648 A1 | 1/2003 |
| WO | WO 03/002649 A1 | 1/2003 |
| WO | WO 03/054081 A1 | 7/2003 |

(Continued)

OTHER PUBLICATIONS

International Search Report (PCT/ISA/210) issued on Feb. 22, 2010, by European Patent Office as the International Searching Authority for International Application No. PCT/EP2009/067550.

*Primary Examiner* — Mark Eashoo
*Assistant Examiner* — Marilou Lacap
(74) *Attorney, Agent, or Firm* — Dickinson Wright PLLC

(57) ABSTRACT

The invention relates to a rubber composition that is free of zinc or that contains less than 0.5 phr of zinc, which can be used for the manufacture of tires, based on at least:

one diene elastomer;
one sulphur-based crosslinking system;
one inorganic filler as reinforcing filler;
one blocked mercaptosilane of general formula I below:

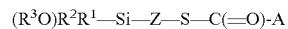

$$(R^3O)R^2R^1—Si—Z—S—C(=O)\text{-}A$$

in which:

$R^1$ and $R^2$, which are identical or different, represent a monovalent hydrocarbon-based group chosen from alkyls, which are linear or branched, cycloalkyls or aryls, having from 1 to 18 carbon atoms;

$R^3$ represents a monovalent hydrocarbon-based group chosen from linear or branched alkyls having from 1 to 4 carbon atoms;

A represents hydrogen or a monovalent hydrocarbon-based group chosen from alkyls, which are linear or branched, cycloalkyls or aryls, having from 1 to 18 carbon atoms;

Z represents a divalent bonding group comprising from 1 to 18 carbon atoms.

24 Claims, No Drawings

(56) References Cited

FOREIGN PATENT DOCUMENTS

| WO | WO 2004/003067 | A1 | 1/2004 |
| WO | WO 2004/056915 | A1 | 7/2004 |
| WO | WO 2004/096865 | A2 | 11/2004 |
| WO | WO 2006/069792 | A1 | 7/2006 |
| WO | WO 2006/069793 | A1 | 7/2006 |
| WO | WO 2008/055986 | A2 | 5/2008 |
| WO | WO 2008/153876 | A1 | 12/2008 |

* cited by examiner

RUBBER COMPOSITION COMPRISING A BLOCKED MERCAPTOSILANE COUPLING AGENT

The present invention relates to diene rubber compositions, reinforced with an inorganic filler such as silica, which can be used, in particular, for the manufacture of tyres or of semi-finished products for tyres such as treads.

The vulcanization of diene elastomers by sulphur is widely used in the rubber industry, in particular in the tyre industry. In order to vulcanize diene elastomers, a relatively complex vulcanization system is used that comprises, in addition to sulphur, various vulcanization accelerators and also one or more vulcanization activators, very particularly derivatives of zinc such as zinc oxide (ZnO) or zinc salts of fatty acids such as zinc stearate.

A medium-term objective of tyre manufacturers is to eliminate zinc or its derivatives from their rubber formulations, due to the known, relatively toxic nature of these compounds, especially with respect to water and aquatic organisms (classification R50 according to European Directive 67/548/EEC of 9 Dec. 1996).

It is found, however, that the elimination of zinc oxide, specifically in rubber compositions reinforced with an inorganic filler such as silica, very greatly degrades the processability characteristics of the rubber compositions in the raw state, with a reduction in the scorch time that is unacceptable from an industrial point of view. It is recalled that the "scorch" phenomenon rapidly results, during the preparation of rubber compositions in an internal mixer, in premature vulcanizations ("scorching"), in very high viscosities in the raw state, and ultimately in rubber compositions that are almost impossible to work and to process industrially.

In order to respond to the problem of zinc elimination, it has of course been proposed to replace zinc oxide with another metal oxide, for example MgO, or else with a salt or oxide of a transition metal belonging to groups IIA, IVA, VA, VIA, VIIA or VIIIA from the Periodic Table of the Elements, particularly cobalt or nickel (see patent documents U.S. Pat. No. 6,506,827 and WO 2003/054081).

Such solutions, besides the fact that they do not satisfy the requirements of rubber compositions reinforced with an inorganic filler, at least for some of them, are not really acceptable in the long term, from the point of view of "sustainable development" and of environmental protection, in so far as they propose to replace one metal with another metal, equally doomed to eventually be dispersed in the environment with the tyre wear debris, particularly tread wear debris, inevitably resulting from the various frictions due, for the most part, to braking, acceleration and cornering forces.

Among the very large number of existing coupling agents for producing the bond between a reinforcing inorganic filler and a diene elastomer, the Applicants have surprisingly found that certain specific coupling agents made it possible to very significantly decrease the zinc of rubber formulations reinforced with an inorganic filler such as silica, or even to eliminate it completely, without replacing the zinc with another metal and while protecting the rubber compositions from the problem of premature scorching during the industrial processing thereof.

Consequently, a first objective of the invention relates to a rubber composition used for manufacturing tyres, said composition being characterized in that it is free of zinc or almost free of zinc (i.e. containing less than 0.5 phr of zinc) and is based on at least one diene elastomer, one reinforcing filler predominantly consisting of an inorganic filler, one sulphur-based crosslinking system and one coupling agent consisting of a blocked mercaptosilane of general formula I below:

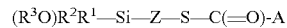

in which:
R$^1$ and R$^2$, which are identical or different, represent a monovalent hydrocarbon-based group chosen from alkyls, which are linear or branched, cycloalkyls or aryls, having from 1 to 18 carbon atoms;
R$^3$ represents a monovalent hydrocarbon-based group chosen from linear or branched alkyls having from 1 to 4 carbon atoms;
A represents hydrogen or a monovalent hydrocarbon-based group chosen from alkyls, which are linear or branched, cycloalkyls or aryls, having from 1 to 18 carbon atoms;
Z represents a divalent bonding group comprising from 1 to 18 carbon atoms.

Advantageously, the diene elastomer being chosen from the group consisting of polybutadienes, synthetic polyisoprenes, natural rubber, butadiene copolymers, isoprene copolymers and mixtures of these elastomers.

Preferably, the reinforcing inorganic filler is the predominant reinforcing filler; and more preferably it is a siliceous or aluminous filler.

The invention also relates to a process for preparing a composition that is free of zinc or that contains less than 0.5 phr of zinc, characterized in that, incorporated at least, by kneading, into at least (i) one diene elastomer, are (ii) an inorganic filler as reinforcing filler, (iii) a blocked mercaptosilane of general formula I below:

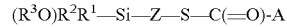

in which:
R$^1$ and R$^2$, which are identical or different, represent a monovalent hydrocarbon-based group chosen from alkyls, which are linear or branched, cycloalkyls or aryls, having from 1 to 18 carbon atoms;
R$^3$ represents a monovalent hydrocarbon-based group chosen from linear or branched alkyls having from 1 to 4 carbon atoms;
A represents hydrogen or a monovalent hydrocarbon-based group chosen from alkyls, which are linear or branched, cycloalkyls or aryls, having from 1 to 18 carbon atoms;
Z represents a divalent bonding group comprising from 1 to 18 carbon atoms, and (iv) a sulphur-based vulcanization system.

The invention further relates to a tyre or a semi-finished product, in particular a tread, comprising a rubber composition, characterized in that it is free of zinc or almost free of zinc and is based on at least one diene elastomer, one reinforcing filler predominantly consisting of an inorganic filler, one sulphur-based crosslinking system and one coupling agent consisting of a blocked mercaptosilane of general formula I below:

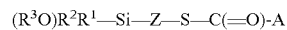

in which:
R$^1$ and R$^2$, which are identical or different, represent a monovalent hydrocarbon-based group chosen from alkyls, which are linear or branched, cycloalkyls or aryls, having from 1 to 18 carbon atoms;
R$^3$ represents a monovalent hydrocarbon-based group chosen from linear or branched alkyls having from 1 to 4 carbon atoms;

A represents hydrogen or a monovalent hydrocarbon-based group chosen from alkyls, which are linear or branched, cycloalkyls or aryls, having from 1 to 18 carbon atoms;

Z represents a divalent bonding group comprising from 1 to 18 carbon atoms.

I. MEASUREMENTS AND TESTS USED

The rubber compositions are characterized, before and after curing, as indicated below.

I-1. Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 rpm and the working torque for maintaining this movement is measured after rotating for 4 minutes. The Mooney plasticity (ML 1+4) is expressed in "Mooney unit" (MU, with 1 MU=0.83 Newton·meter).

I-2. Scorch Time

The measurements are carried out at 130° C., in accordance with French Standard NF T 43-005. The change in the consistometric index as a function of time makes it possible to determine the scorch time of the rubber compositions, assessed in accordance with the abovementioned standard, by the parameter T5 (case of a large rotor), expressed in minutes, and defined as being the time necessary to obtain an increase in the consistometric index (expressed in MU) of 5 units above the minimum value measured for this index.

I-3. Tensile Tests

These tensile tests make it possible to determine the elasticity stresses and the properties at break. Unless otherwise indicated, they are carried out in accordance with French Standard NF T 46-002 of September 1988. The nominal secant moduli (or apparent stresses, in MPa) are measured at 10% elongation (denoted M10), 100% elongation (denoted M100) and 300% elongation (denoted M300). The tensile strengths (in MPa) and the elongations at break (in %) are also measured.

I-4. Dynamic Properties

The dynamic properties $\Delta G^*$ and $\tan(\delta)_{max}$ are measured on a viscosity analyser (Metravib VA4000), in accordance with Standard ASTM D 5992-96. The response of a sample of vulcanized composition (cylindrical test specimen with a thickness of 4 mm and with a cross section of 400 mm$^2$), subjected to a sinusoidal stress in simple alternating shear, at a frequency of 10 Hz, under normal temperature conditions (23° C.), is recorded in accordance with Standard ASTM D 1349-99. A scan with a strain amplitude ranging from 0.1 to 50% (forward cycle) then from 50% to 0.1% (return cycle) is carried out. The results made use of are the complex dynamic shear modulus (G*) and the loss factor (tan δ). For the return cycle, the maximum value of tan δ observed ($\tan(\delta)_{max}$), and also the difference in the complex modulus ($\Delta G^*$) between the values at 0.1 and 50% strain (the Payne effect) are indicated.

II. DETAILED DESCRIPTION OF THE INVENTION

The compositions of the invention are therefore based on at least: (i) one (at least one) diene elastomer, (ii) one (at least one) inorganic filler as reinforcing filler, (iii) one (at least one) specific blocked mercaptosilane of general formula (I) as inorganic filler/diene elastomer coupling agent (phr=parts per hundred parts of elastomer, by weight).

The expression "composition based on" should be understood, in the present application, to mean a composition comprising the reaction product and/or mixture of the various constituents used, some of these base constituents (for example the coupling agent) being capable of reacting or intended to react with one another, at least in part, during the various phases of manufacture of the compositions, in particular during their vulcanization (curing).

In the present description, unless expressly indicated otherwise, all the percentages (%) indicated are % by weight.

II-1. Diene Elastomer

A "diene" elastomer or rubber is understood to mean, generally, an elastomer resulting at least partly (i.e., a homopolymer or a copolymer) from diene monomers (monomers bearing two carbon-carbon double bonds which may or may not be conjugated).

Diene elastomers may be classified, in a known manner, into two categories: those said to be "essentially unsaturated" and those said to be "essentially saturated". The expression "essentially unsaturated diene elastomer" is understood to mean a diene elastomer resulting at least partly from conjugated diene monomers, having a content of units of diene origin (conjugated dienes) that is greater than 15% (mol %). Thus, for example, diene elastomers such as butyl rubbers or diene/α-olefin copolymers of the EPDM type do not fall under this definition and may be described, on the contrary, as "essentially saturated diene elastomers" (low or very low content of units of diene origin, always less than 15%). Within the "essentially unsaturated" diene elastomer category, the expression "highly unsaturated diene elastomer" is understood in particular to mean a diene elastomer having a content of units of diene origin (conjugated dienes) that is greater than 50%.

Having given these definitions, it will be understood more particularly that a diene elastomer that can be used in the compositions according to the invention means:

(a) —any homopolymer obtained by polymerizing a conjugated diene monomer having 4 to 12 carbon atoms;

(b) —any copolymer obtained by copolymerizing one or more conjugated dienes with one another or with one or more vinylaromatic compounds having 8 to 20 carbon atoms;

(c) —a ternary copolymer obtained by copolymerizing ethylene, an α-olefin having 3 to 6 carbon atoms with an unconjugated diene monomer having 6 to 12 carbon atoms, such as for example the elastomers obtained from ethylene, propylene and an unconjugated diene monomer of the aforementioned type such as in particular 1,4-hexadiene, ethylidene norbornene and dicyclopentadiene; and (d) —a copolymer of isobutene and isoprene (butyl rubber), and also the halogenated, in particular chlorinated or brominated, versions of this type of copolymer.

Although the present invention applies to any type of diene elastomer, a person skilled in the art of tyres will understand that it is preferably used with essentially unsaturated diene elastomers, in particular of the (a) or (b) type above.

Suitable conjugated dienes are, in particular, 1,3-butadiene, 2-methyl-1,3-butadiene, 2,3-di($C_1$-$C_5$)alkyl-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. Suitable vinylaromatic compounds are, for example, styrene, ortho-, meta- and para-methylstyrene, the commercial "vinyl-toluene" mixture, para-(tert-butyl)styrene, methoxystyrenes, chloro-styrenes, vinylmesitylene, divinylbenzene and vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or else functionalized with a coupling and/or star-branching or functionalizing agent. For coupling with carbon black, mention may be made, for example, of functional groups comprising a C—Sn bond or of aminated functional groups, such as benzophenone, for example; for coupling with a reinforcing inorganic filler such as silica, mention may be made, for example, of silanol functional groups or polysiloxane functional groups having a silanol end (as described, for example, in FR 2 740 778 or U.S. Pat. No. 6,013,718), of alkoxysilane groups (as described, for example, in FR 2 765 882 or U.S. Pat. No. 5,977,238), of carboxyl groups (as described, for example, in WO 01/92402 or U.S. Pat. No. 6,815,473, WO 2004/096865 or US 2006/0089445) or else of polyether groups (as described, for example, in EP 1 127 909 or U.S. Pat. No. 6,503,973). Mention may also be made, as other examples of functionalized elastomers, of the to elastomers (such as SBR, BR, NR or LR) of the epoxidized type.

Polybutadienes are suitable and in particular those having a content (mol %) of 1,2-units of between 4% and 80% or those having a content (mol %) of cis-1,4-units of greater than 80%, polyisoprenes, butadiene/styrene copolymers and in particular those having a $T_g$ (glass transition temperature, $T_g$, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and in particular those having an isoprene content of between 5% and 90% by weight and a $T_g$ of −40° C. to −80° C., or isoprene/styrene copolymers and in particular those having a styrene content of between 5% and 50% by weight and a $T_g$ of between −25° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a $T_g$ of between −20° C. and −70° C., are suitable in particular.

To sum up, the diene elastomer of the composition in accordance with the invention is particularly preferably chosen from the group of (highly unsaturated) diene elastomers consisting of polybutadienes (BRs), synthetic polyisoprenes (IRs), natural rubber (NRs), butadiene copolymers, isoprene copolymers and mixtures of these elastomers. Such copolymers are more preferably chosen from the group consisting of butadiene/styrene copolymers (SBRs), isoprene/butadiene copolymers (BIRs), isoprene/styrene copolymers (SIRs), isoprene/butadiene/styrene copolymers (SBLRs) and mixtures of such copolymers.

According to one particular embodiment, the diene elastomer is predominantly (i.e., for more than 50 phr) an SBR, whether it is an SBR prepared in emulsion ("ESBR") or an SBR prepared in solution ("SSBR"), or an SBR/BR, SBR/NR (or SBR/IR), BR/NR (or BR/IR) or else SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a $T_g$ of between −10° C. and −55° C.; such an SBR can advantageously be used as a mixture with a BR preferably having more than 90% (mol %) of cis-1,4-bonds.

According to another particular embodiment, the diene elastomer used is predominantly (more than 50 phr) an isoprene elastomer. This is the case in particular when the compositions of the invention are intended to constitute, in tyres, the rubber matrices of certain treads (for example, for industrial vehicles), of crown reinforcement plies (for example, working plies, protective plies or hoop plies), of carcass reinforcement plies, of sidewalls, of beads, of protectors, of sublayers, of blocks of rubber and other inner liners providing the interface between the aforementioned tyre zones.

The expression "isoprene elastomer" is, understood, in a known manner, to mean an isoprene homopolymer or copolymer, in other words a diene elastomer chosen from the group consisting of natural rubber (NR), synthetic polyisoprenes (IR), various isoprene copolymers and mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably natural rubber or a synthetic cis-1,4-polyisoprene; use is preferably made, among these synthetic polyisoprenes, of polyisoprenes having a content (mol %) of cis-1,4-bonds of greater than 90%, more preferably still of greater than 98%.

According to another particular embodiment, especially when it is intended for a tyre sidewall, for an airtight inner liner of a tubeless tyre (or other air-impermeable element), the composition in accordance with the invention may contain at least one essentially saturated diene elastomer, in particular at least one EPDM copolymer or a butyl rubber (optionally chlorinated or brominated), whether these copolymers are used alone or as a mixture with highly unsaturated diene elastomers such as mentioned previously, especially NR or IR, BR or SBR.

According to another preferred embodiment of the invention, the rubber composition comprises a blend of a (one or more) "high $T_g$" diene elastomer exhibiting a $T_g$ of between −70° C. and 0° C. and of a (one or more) "low $T_g$" diene elastomer exhibiting a $T_g$ of between −110° C. and −80° C., more preferably between −105° C. and −90° C. The high $T_g$ elastomer is preferably chosen from the group consisting of S-SBRs, E-SBRs, natural rubber, synthetic polyisoprenes (having a content (mol %) of cis-1,4-linkages preferably greater than 95%), BIRs, SIRS, SBIRs and mixtures of these elastomers. The low $T_g$ elastomer preferably comprises butadiene units in a content (mol %) at least equal to 70%; it preferably consists of a polybutadiene (BR) having a content (mol %) of cis-1,4-linkages greater than 90%.

According to another particular embodiment of the invention, the rubber composition comprises, for example, from 30 to 100 phr, in particular from 50 to 100 phr, of a high $T_g$ elastomer as a blend with 0 to 70 phr, in particular from 0 to 50 phr, of a low $T_g$ elastomer; according to another example, it comprises, for the whole of the 100 phr, one or more SBR(s) prepared in solution.

According to another particular embodiment of the invention, the diene elastomer of the composition according to the invention comprises a blend of a BR (as low $T_g$ elastomer) having a content (mol %) of cis-1,4-linkages greater than 90%, with one or more S-SBRs or E-SBRs (as high $T_g$ elastomer(s)).

The compositions of the invention may contain a single diene elastomer or a mixture of several diene elastomers, it being possible for the diene elastomer(s) to be used in combination with any type of synthetic elastomer other than a diene elastomer, or even with polymers other than elastomers, for example thermoplastic polymers.

II-2. Reinforcing Inorganic Filler

The expression "reinforcing inorganic filler" should be understood here, in a known manner, to mean any inorganic or mineral filler, whatever its colour and its origin (natural or synthetic), also known as "white filler", "clear filler" or even "non-black filler", in contrast to carbon black, this inorganic filler being capable of reinforcing by itself alone, without means other than an intermediate coupling agent, a rubber composition intended for the manufacture of a tyre tread, in other words capable of replacing, in its reinforcing role, a conventional tyre-grade carbon black, in particular for a tread; such a filler is generally characterized, in a known manner, by the presence of hydroxyl (—OH) groups at its surface.

Preferably, the reinforcing inorganic filler is a siliceous filler or aluminous filler, or a mixture of these two types of fillers.

The silica ($SiO_2$) used may be any reinforcing silica known to a person skilled in the art, especially any precipitated or pyrogenic silica exhibiting a BET surface area and a CTAB specific surface area both of less than 450 $m^2/g$, preferably from 30 to 400 $m^2/g$. Highly dispersible precipitated silicas (referred to as "HDSs") are preferred, in particular when the invention is used for the manufacture of tyres that have a low rolling resistance. Mention may especially be made, as examples of such silicas, of the Ultrasil 7000 silicas from Degussa, the Zeosil 1165 MP, 1135 MP and 1115 MP silicas from Rhodia, the Hi-Sil EZ150G silica from PPG, the Zeopol 8715, 8745 or 8755 silicas from Huber.

The reinforcing alumina ($Al_2O_3$) used is preferably a highly dispersible alumina having a BET surface area ranging from 30 to 400 $m^2/g$, more preferably between 60 and 250 $m^2/g$, and a mean particle size at most equal to 500 nm, more preferably at most equal to 200 nm. Mention may especially be made, as non-limiting examples of such reinforcing aluminas, of the "Baikalox A125" or "CR125" (Baïkowski), "APA-100RDX" (Condéa), "Aluminoxid C" (Degussa) or "AKP-G015" (Sumitomo Chemicals) aluminas.

Mention may also be made, as other examples of inorganic filler capable of being used in the rubber compositions of treads of the invention, of aluminium (oxide) hydroxides, aluminosilicates, titanium oxides, silicon carbides or nitrides, all of the reinforcing type as described for example in Applications WO 99/28376, WO 00/73372, WO 02/053634, WO 2004/003067 and WO 2004/056915.

When the treads of the invention are intended for tyres with low rolling resistance, the reinforcing inorganic filler used, in particular when it is silica, preferably has a BET surface area between 60 and 350 $m^2/g$. One advantageous embodiment of the invention consists in using a reinforcing inorganic filler, in particular a silica, having a high BET specific surface area, within a range from 130 to 300 $m^2/g$, due to the high reinforcing power recognized for such fillers. According to another preferred embodiment of the invention, use may be made of a reinforcing inorganic filler, in particular a silica, exhibiting a BET specific surface area of less than 130 $m^2/g$, preferably in such a case of between 60 and 130 $m^2/g$ (see, for example, Applications WO 03/002648 and WO 03/002649).

The physical state under which the reinforcing inorganic filler is provided is not important, whether it is in the form of a powder, of microbeads, of granules, of balls or any other appropriate densified form. Of course, the expression "reinforcing inorganic filler" is also understood to mean mixtures of various reinforcing inorganic fillers, in particular of highly dispersible siliceous and/or aluminous fillers as described above.

A person skilled in the art will know how to adjust the content of reinforcing inorganic filler according to the nature of the inorganic filler used and according to the type of tyre concerned, for example a tyre for a motorcycle, for a passenger vehicle or for a utility vehicle, such as a van or a heavy-duty vehicle. Preferably, this content of reinforcing inorganic filler will be chosen between 20 and 200 phr, more preferably between 30 and 150 phr, in particular greater than 50 phr and more preferably still between 60 and 140 phr.

In the present account, the BET specific surface area is determined in a known manner by gas adsorption using the Brunauer-Emmett-Teller method described in "*The Journal of the American Chemical Society*", Vol. 60, page 309, February 1938, more specifically according to French Standard NF ISO 9277 of December 1996 (multipoint volumetric method (5 points)—gas: nitrogen—degassing: 1 hour at 160° C.—relative pressure range p/po: 0.05 to 0.17). The CTAB specific surface area is the external surface determined according to French Standard NF T 45-007 of November 1987 (method B).

Finally, a person skilled in the art will understand that a reinforcing filler of another nature, in particular an organic filler, might be used as equivalent filler to the reinforcing inorganic filler described in the present section, provided that this reinforcing filler is covered with an inorganic layer, such as silica, or else comprises, at its surface, functional sites, in particular hydroxyl sites, requiring the use of a coupling agent in order to establish the bonding between the filler and the elastomer. Mention may be made, as examples of such organic fillers, of functionalized polyvinylaromatic organic fillers, such as described in Applications WO 2006/069792 and WO 2006/069793.

The reinforcing inorganic filler may also be used combined with an organic reinforcing filler, in particular carbon black, for example a black of the HAF, ISAF or SAF type, conventionally used in tyres and particularly in tyre treads, (for example N115, N134, N234, N330, N339, N347 or N375 blacks, or else, depending on the applications targeted, the blacks of higher series, for example N660, N683 or N772). These carbon blacks may be used in the isolated state, as available commercially, or in any other form, for example as a support for some of the rubber additives used. The carbon blacks might, for example, be already incorporated into the elastomer in the form of a masterbatch (see, for example, Applications WO 97/36724 or WO 99/16600).

The amount of carbon black present in the total reinforcing filler may vary to a large extent, however the reinforcing inorganic filler is preferably the predominant reinforcing filler. Advantageously, carbon black is used in a very small proportion, at a preferred content of less than 10 phr. In the ranges indicated, the colouring properties (black pigmenting agent) and UV-stabilizing properties of the carbon blacks are benefited from, without, moreover, adversely affecting the typical performances provided by the reinforcing inorganic filler. Of course, the composition of the invention may itself be completely free of carbon black.

II-3. Coupling Agent

It is recalled here that the expression "coupling agent" is understood, in a known manner, to mean an agent capable of establishing a sufficient bond, of chemical and/or physical nature, between the inorganic filler and the diene elastomer; such a coupling agent, which is at least bifunctional, has, for example, a simplified general formula "Y—Z—X", in which:

Y represents a functional group ("Y" functional group) which is capable of bonding physically and/or chemically to the inorganic filler, such a bond possibly being established, for example, between a silicon atom of the coupling agent and the surface hydroxyl (OH) groups of the inorganic filler (for example, the surface silanols when it is silica);

X represents a functional group ("X" functional group) capable of bonding physically and/or chemically to the diene elastomer, for example via a sulphur atom; and Z represents a divalent group allowing Y to be linked to X.

Coupling agents, especially silica/diene elastomer coupling agents, have been described in a very large number of documents, the most well-known being bifunctional organosilanes bearing alkoxy functional groups (i.e., by definition, "alkoxysilanes") as "Y" functional groups and, as "X" functional groups, functional groups capable of reacting with the diene elastomer, such as for example polysulphide functional groups.

Among the known alkoxysilane-polysulphide compounds, mention should particularly be made of bis(3-triethoxysilylpropyl)tetrasulphide (abbreviated to "TESPT"), of formula $[(C_2H_5O)_3Si(CH_2)_3S_2]_2$, sold especially by Degussa under the name "Si69" (or "X50S" when it is 50 wt % supported on carbon black), in the form of a commercial mixture of polysulphides $S_x$ with a mean value for x which is close to 4.

TESPT, known for a very long time, is still regarded today as the product that provides the best compromise in terms of scorch safety, hysteresis and reinforcing power, for rubber compositions reinforced with a reinforcing inorganic filler such as silica. It is, in this respect, the reference coupling agent of a person skilled in the art for silica-filled tyres having a low rolling resistance, sometimes described as "Green Tyres" for the energy saving afforded (or "energy-saving Green Tyres").

This TESPT coupling agent is not suitable for the compositions of the invention that are zinc-free or almost zinc-free (i.e. that contain less than 0.5 phr of zinc, preferably less than 0.3 phr), the invention having revealed that the latter necessitate the use of a specific blocked mercaptosilane.

It is recalled here that blocked mercaptosilanes, as is well-known to a person skilled in the art, are precursors of silanes that are capable of forming mercaptosilanes during the preparation of rubber compositions (see, for example, US 2002/0115767 A1 or international Application WO 02/48256). The molecules of these silane precursors, referred to hereinbelow as blocked mercaptosilanes, have a blocking group in place of the hydrogen atom of the corresponding mercaptosilane. The blocked mercaptosilanes are capable of being unblocked by replacing the blocking group with a hydrogen atom, during compounding and curing, in order to result in the formation of a more reactive mercaptosilane, defined as a silane having a molecular structure that contains at least one thiol (—SH) (mercapto-) group bonded to a carbon atom and at least one silicon atom. These blocked mercaptosilane coupling agents may be used alone or in the presence of a blocked mercaptosilane activator, the role of which is to initiate, accelerate or boost the reactivity of the blocked mercaptosilane.

Use is made of the specific blocked mercaptosilane corresponding to the general formula (I):

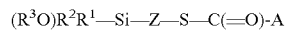

$(R^3O)R^2R^1$—Si—Z—S—C(=O)-A in which:

R$^1$ and R$^2$, which are identical or different, represent a monovalent hydrocarbon-based group chosen from alkyls, which are linear or branched, cycloalkyls or aryls, having from 1 to 18 carbon atoms;

R$^3$ represents a monovalent hydrocarbon-based group chosen from linear or branched alkyls having from 1 to 4 carbon atoms;

A represents hydrogen or a monovalent hydrocarbon-based group chosen from alkyls, which are linear or branched, cycloalkyls or aryls, having from 1 to 18 carbon atoms;

Z represents a divalent bonding group comprising from 1 to 18 carbon atoms

Z may contain one or more heteroatoms chosen from O, S and N.

Preferably:

R$^1$ and R$^2$ are chosen from methyl, ethyl, n-propyl and isopropyl, preferably from methyl and ethyl;

R$^3$ represents chosen from methyl and ethyl;

A is chosen from alkyls having from 1 to 18 carbon atoms and the phenyl radical;

Z is chosen from $C_1$-$C_{18}$ alkylenes and $C_6$-$C_{12}$ arylenes.

According to one embodiment, Z is chosen from $C_1$-$C_{10}$ alkylenes and more preferably Z is chosen from $C_1$-$C_4$ alkylenes.

According to another embodiment, R$^1$ and R$^2$ are methyls.

Preferably, A is chosen from alkyls having from 1 to 7 carbon atoms and the phenyl radical.

One coupling agent that is particularly suitable is S-octanoylmercaptopropylethoxydimethylsilane, the formula (I) thereof is such that R$^1$ and R$^2$ are methyls, A is a heptyl, R$^3$ is an ethyl and Z is a propylene.

Such a compound corresponding to the generic formulation (I) above is known as a coupling agent for compositions comprising silica as reinforcing filler and their synthesis is especially described in Patent Application WO 2008/055986.

A person skilled in the art will know how to adjust the content of blocked mercaptosilane of formula (I) as a function of the particular embodiments of the invention, especially of the amount of reinforcing inorganic filler used, the preferred content representing between 2% and 20% by weight relative to the amount of reinforcing inorganic filler; contents of less than 15% are more particularly preferred.

Taking into account the amounts expressed above, generally the blocked mercaptosilane content of is preferably between 2 and 15 phr. Below the minimum indicated, the effect risks being insufficient, whereas above the recommended maximum, no further improvement is generally observed, whereas the costs of the composition increase. For these various reasons, this content is more preferably still between 4 and 12 phr.

II-5. Various Additives

The rubber compositions in accordance with the invention may also comprise all or some of the usual additives customarily used in the elastomer compositions intended for the manufacture of tyres, in particular of treads, such as, for example, plasticizers or extender oils, whether the latter are of aromatic or non-aromatic nature, pigments, protective agents, such as anti-ozone waxes, chemical antiozonants, antioxidants, anti-fatigue agents, reinforcing resins, methylene acceptors (for example, phenol-novolac resin) or methylene donors (for example, HMT or H3M) as described, for example, in Application WO 02/10269, a crosslinking system based either on sulphur or on sulphur donors and/or on peroxide and/or on bismaleimides, vulcanization accelerators and vulcanization activators, excluding, of course, zinc-based activators (or in compliance with less than 0.5 phr of zinc in the composition, and preferably less than 0.3 phr).

Preferably, these compositions comprise, as preferred non-aromatic or very weakly aromatic plasticizing agent, at least one compound chosen from the group consisting of naphthenic oils, paraffinic oils, MES oils, TDAE oils, glycerol esters (in particular trioleates), hydrocarbon-based plasticizing resins exhibiting a high $T_g$ preferably of greater than 30° C., and mixtures of such compounds.

These compositions may, in addition to coupling agents, also contain coupling activators, covering agents (comprising for example the sole Y functional group) for covering the reinforcing inorganic filler or more generally processing aids capable, in a known manner, by virtue of an improvement in the dispersion of the inorganic filler in the rubber matrix and of a lowering in the viscosity of the compositions, of improving their ability to be processed in the raw state, these agents being, for example, hydrolysable silanes, such as alkylalkoxysilanes (especially alkyltriethoxysilanes), hydroxysilanes, polyols, polyethers (for example polyethylene glycols), primary, secondary or tertiary amines (for example trialkanolamines), hydroxylated or hydrolysable POSs, for example α,ω-dihydroxy-polyorganosiloxanes (especially α,ω-dihydroxy-polydimethylsiloxanes), fatty acids such as, for example, stearic acid.

II-6. Manufacture of the Rubber Compositions

The rubber compositions of the invention are manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated.

According to one preferred embodiment of the invention, all the base constituents of the compositions of the invention, with the exception of the vulcanization system, namely the reinforcing inorganic filler, the coupling agent of formula (I) and the carbon black, are intimately incorporated, by kneading, into the diene elastomer during the so-called non-productive first phase, that is to say at least these various base constituents are introduced into the mixer and thermomechanically kneaded, in one or more steps, until the maximum temperature between 130° C. and 200° C., preferably between 145° C. and 185° C., is reached.

By way of example, the first (non-productive) phase is carried out in a single thermomechanical stage during which all the necessary constituents, the optional complementary covering agents or processing aids and other various additives, with the exception of the vulcanization system, are introduced into a suitable mixer, such as a standard internal mixer. The total kneading time in this non-productive phase is preferably between 1 and 15 min. After cooling the mixture obtained in this way during the non-productive first phase, the vulcanization system is then incorporated at low temperature, generally in an external mixer such as an open mill. All the ingredients are then mixed (productive phase) for a few minutes, for example between 2 and 15 min.

When a covering agent is used, it may be incorporated completely during the non-productive phase, at the same time as the inorganic filler, or else completely during the productive phase, at the same time as the vulcanization system, or else partly over the two successive phases.

It should be noted that it is possible to introduce all or part of the covering agent in a supported form (it being placed on the support beforehand) on a solid compatible with the chemical structures corresponding to this compound. For example, when being split between the two successive phases above, it may be advantageous to introduce the second part of the covering agent, on the external mixer, after being placed on a support in order to facilitate the incorporation thereof and the dispersion thereof.

The vulcanization system itself is preferably based on sulphur and on a primary vulcanization accelerator, in particular an accelerator of the sulphenamide type. Various known vulcanization activators or secondary accelerators, excluding zinc and any zinc derivative such as ZnO or complying with a zinc content of the composition of less than 0.5 phr, and preferably of less than 0.3 phr, such as for example fatty acids such as stearic acid, guanidine derivatives (in particular diphenylguanidine), etc. may be added to this vulcanization system. The sulphur content is preferably between 0.5 and 3.0 phr, and the content of primary accelerator is preferably between 0.5 and 5.0 phr.

The final composition thus obtained is then calendered, for example in the form of a film or a sheet, especially for laboratory characterization, or else extruded in the form of a rubber profiled element that can be used for example as a tyre tread for a passenger vehicle.

The vulcanization (or curing) is carried out in a known manner at a temperature generally between 130° C. and 200° C., for a sufficient time, which may for example vary between 5 and 90 minutes, depending in particular on the curing temperature, on the vulcanization system adopted and on the vulcanization kinetics of the composition in question.

The invention relates to the rubber compositions described previously both in the "raw" state (i.e., before curing) and in the "cured" or vulcanized state (i.e., after crosslinking or vulcanization). The compositions in accordance with the invention may be used alone or as a blend (i.e., as a mixture) with any other rubber composition that can be used for the manufacture of tyres.

III. EXEMPLARY EMBODIMENTS OF THE INVENTION

III-1 Synthesis of S-octanoylmercaptopropylethoxydimethylsilane with CAS Number [1024594-66-8]

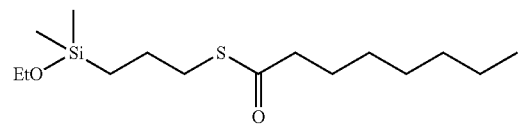 [SMILES: CCCCCCCC(=O)SCCC[Si](C)(C)OCC]

The synthesis of this compound is described in Example No. 10 of Patent Application FR 2 908 410 (WO 2008/055986 A2). No indication of purity is given for this procedure (the authors describe however a yellow oil whereas the 99.5% pure product is colourless).

It is possible to prepare the product using a procedure that starts directly from the chlorosilane and not from the alkoxysilane as described in the preceding patent application. It is possible to isolate the final product with a molar purity of 99.5%.

General scheme:

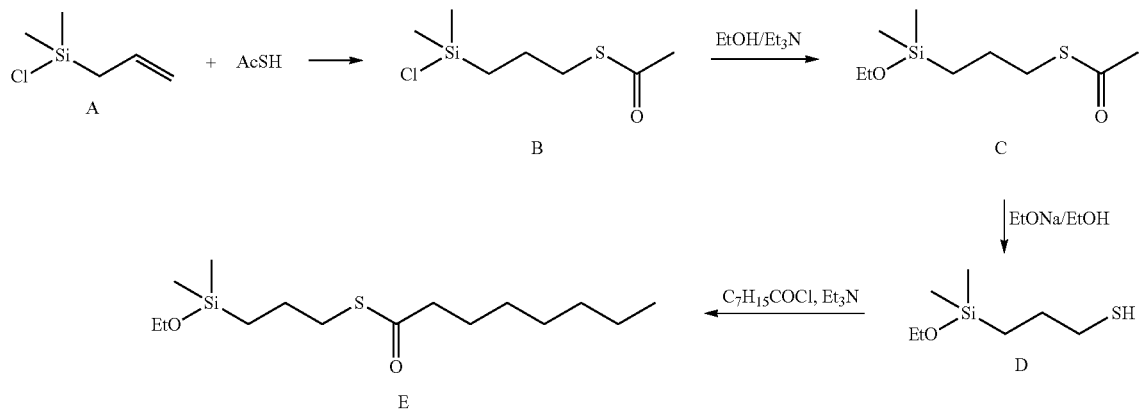

a) Synthesis of S-(ethanoyl)mercaptopropylethoxydimethylsilane C with CAS number [1024594-63-5]

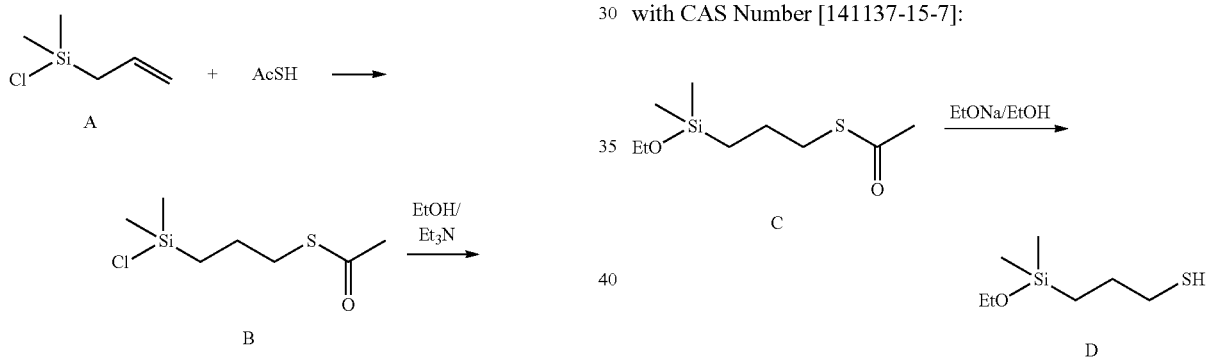

Added, at ambient temperature, to the allyldimethylchlorosilane A with CAS number [4028-23-3] (45.1 g, 0.335 mol) is thioacetic acid (25.5 g, 0.335 mol) under argon. The reaction is exothermic. The reaction medium is stirred for 3.5 hours at 85-95° C. After returning to ambient temperature, the intermediate silane B, which is not isolated, is added dropwise to a solution of triethylamine (51.2 g, 0.506 mol) in absolute ethanol (200 ml) over 15-20 min at 0° C. under argon. After stirring for 15 hours at ambient temperature the precipitate of triethylamine hydrochloride Et₃N.HCl is filtered. After evaporating the solvents under reduced pressure at 40° C., the mixture obtained is put back into solution in heptane (200 ml) and the residue of Et₃N.HCl is removed by filtration. After evaporating the solvents under reduced pressure at 45° C., the S-(ethanoyl)mercaptopropylethoxydimethylsilane C with numero CAS [1024594-63-5] (47.2 g, 0.215 mol) is obtained with a yield of 64%.

NMR analysis confirms the structure of the product obtained with a molar purity of 94%.

b) Preparation of 3-mercaptopropylethoxydimethylsilane D with CAS Number [141137-15-7]:

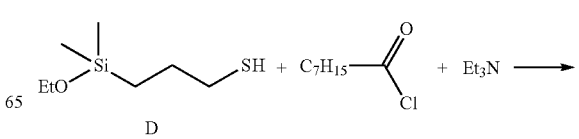

Added, at ambient temperature, to a solution of S-(ethanoyl)mercaptopropylethoxydimethylsilane C (65.4 g, 0.297 mol) in absolute ethanol (230 ml) is solid sodium ethylate (2.02 g, 0.030 mol) under argon. The reaction medium is brought to reflux for 2.5 hours. After returning to ambient temperature, the precipitate of NaCl is filtered and washed with heptane (350 ml). After evaporating the solvents under reduced pressure at 45° C., the oil obtained is purified by vacuum distillation (60° C./10 mbar). The 3-mercaptopropylethoxydimethylsilane D with CAS number [141137-15-7] (34.7 g, 0.195 mol) is obtained with a yield of 66%.

NMR analysis confirms the structure of the product obtained with a molar purity of 99.5%.

c) Preparation of S-octanoylmercaptopropylethoxydimethylsilane E with CAS Number [1024594-66-8]

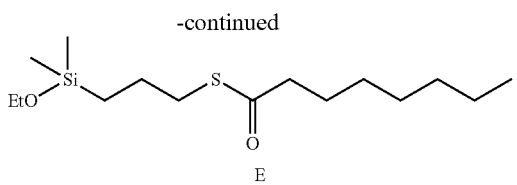

E

Added dropwise at 5° C., under argon, to 3-mercaptopropyldimethylethoxysilane (34.0 g, 0.191 mol) in solution in triethylamine (19.2 g, 0.191 mol) and cyclohexane (400 ml) is octanoyl chloride (31.0 g, 0.191 mol) over 15 minutes at 8° C. The reaction medium is stirred for 15 hours at ambient temperature. The precipitate of triethylamine hydrochloride Et$_3$N.HCl is filtered. The mixture obtained is purified by flash chromatography (eluent: petroleum ether, 500-600 ml). After evaporating the solvents under reduced pressure at 24° C., the S-octanoylmercaptopropylethoxydimethylsilane E with CAS number [1024594-66-8] (45.0 g, 0.148 mol) is obtained in the form of a colourless liquid with a yield of 78%.

NMR analysis confirms the structure of the product obtained with a molar purity of 99.5%.

III-2 Synthesis of the Compound Octylmethyldihydroxysilane

This example illustrates the preparation of the octylmethyldihydroxysilane of formula:

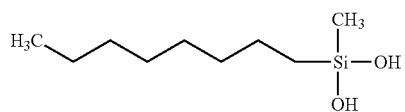

The synthesis of this compound (CAS No. 156218-16-5) was carried out by adapting the procedure described by J. A. Cella and J. C. Carpenter in "*Procedures for the preparation of silanols*", Journal of Organometallic Chemistry, 480 (1994), 23-26, for the preparation of dimethyldihydroxysilane (or dimethylsilanediol).

The synthetic scheme is as follows:

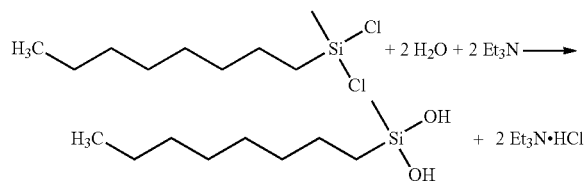

All the reactants are bought from Sigma Aldrich and are used without additional purification.

The procedure is more specifically as follows. Dichlorooctylmethylsilane (CAS No. 14799-93-0) (50.0 g, i.e. 0.22 mol), in solution in anhydrous diethyl ether (300 ml) in a dropping funnel dried beforehand in an oven, is added dropwise at 0° C., under a nitrogen atmosphere, to a 2 liter round-bottomed flask equipped with a mechanical stirrer which contains a solution of triethylamine (45.4 g, 0.45 mol, 2.04 eq), water (8.6 g, 0.48 mol, 2.2 eq), diethyl ether (700 ml) and enough acetone (approximately 70 ml) to have a homogeneous medium. The addition of the dichlorooctylmethylsilane is carried out over approximately 1 h and the resulting suspension is stirred at 0° C. for an additional 30 min. The triethylamine hydrochloride precipitate is removed by filtration and washed once with ether (approximately 100 ml). The solution is concentrated on a rotary evaporator at ambient temperature down to approximately one tenth of its initial volume. An excess of pentane (approximately 50-100 ml) is added and the evaporation is continued. The precipitate is collected by filtration and washed twice with pentane in order to remove the traces of triethylamine.

After evaporating the residual solvents under reduced pressure, a white solid obtained is obtained (31.7 g, 76%, melting point 58° C.). The wash liquors are again evaporated and the solid obtained is washed once with pentane. After removing the residual solvents under reduced pressure a second portion of octylmethylsilanediol is obtained (4.9 g, 12%, melting point 57° C.). The $^1$H and $^{29}$Si NMR analyses show that the product obtained indeed corresponds to the above formula; according to this synthesis example, the purity obtained is greater than 99%, without an additional purification stage.

III-3 Preparation of the Rubber Compositions

The tests which follow are carried out in the following way: the diene elastomer (SBR and BR blend), the silica, supplemented with a small amount of carbon black, the coupling agent and then, after kneading for one to two minutes, the various other ingredients, with the exception of the vulcanization system, are introduced into an internal mixer, 70% filled and having an initial vessel temperature of approximately 90° C. Thermomechanical working (non-productive phase) is then carried out in one stage (total duration of the kneading equal to approximately 5 min) until a maximum "dropping" temperature of approximately 165° C. is reached. The mixture thus obtained is recovered and cooled and then the covering agent (when the latter is present) and the vulcanization system (sulphur and sulphenamide accelerator) are added on an external mixer (homofinisher), at 70° C., the combined mixture being mixed (productive phase) for approximately 5 to 6 min.

The compositions thus obtained are subsequently calendered, either in the form of sheets (thickness of 2 to 3 mm) or of thin films of rubber, for the measurement of their physical or mechanical properties, or in the form of profiled elements which can be used directly, after cutting and/or assembling to the desired dimensions, for example as semi-finished products for tyres, in particular as tyre treads.

III-4 Characterization of the Rubber Compositions

The purpose of this test is to demonstrate the improved properties of a zinc-free rubber composition according to the invention in comparison with rubber compositions that are free of zinc but that use coupling agents conventionally used in rubber compositions for tyre treads having silica as the reinforcing filler.

For this, 6 compositions based on a diene elastomer (SBR/BR blend), reinforced with a highly dispersible silica (HDS) are prepared, these compositions differing essentially in the following technical characteristics:

composition C1 is a "conventional" control composition containing zinc (1.5 phr of ZnO) and the compound TESPT (trade name: "Si69") as coupling agent;

composition C2 corresponds to composition C1 but is free of zinc;

composition C3 is free of zinc and comprises the compound MESPT (trade name: "RP74") frequently used in tyre treads, as coupling agent;

composition C4 is free of zinc and comprises a blocked mercaptosilane (trade name: "Silane NXT") different from the invention, as coupling agent;

composition C5 in accordance with the invention, is free of zinc and comprises S-octanoylmercaptopropylethoxydimethylsilane as coupling agent;

composition C6 in accordance with the invention, is free of zinc and comprises S-octanoylmercaptopropylethoxydimethylsilane as coupling agent and also a covering agent, octylmethyldihydroxysilane.

Therefore, only compositions C5 and C6 are in accordance with the invention.

In order for the properties of these compositions to be comparable, the coupling agents of compositions C2 to C6 are used at a content that is isomolar in silicon compared to the control composition C1.

The conventional coupling agent used in the control composition C1 is TESPT. It is recalled that TESPT is bis(3-triethoxysilylpropyl)tetrasulphide having the structural formula (Et=ethyl):

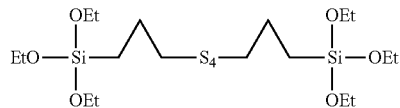

The coupling agent used in composition C3 is MESPT. It is recalled that MESPT is bis(3-dimethylethoxysilylpropyl)tetrasulphide having the structural formula (Et=ethyl):

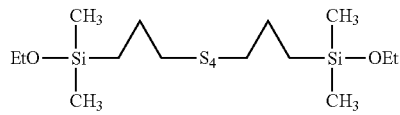

The coupling agent used in composition C4 is Silane NXT. It is recalled that NXT is S-octanoylmercaptopropyltriethoxysilane having the structural formula (Et=ethyl):

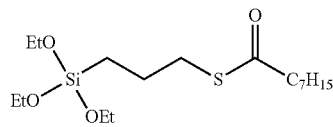

Tables 1 and 2 give the formulation of the various compositions (Table 1-content of the various products expressed in phr or parts by weight per hundred parts of elastomer) and also their properties before and after curing (around 40 min at 150° C.); the vulcanization system consists of sulphur and sulphenamide.

Examination of the results from Table 2 regarding the properties before curing firstly shows, compared to the control composition C1 which contains the conventionally used content of zinc, that only the compositions in accordance with the invention, C5 and C6, comprising a blocked mercaptosilane of general formula (I) make it possible both to maintain an acceptable scorch time T5 (close or identical to that of C1), while significantly improving the processability of the composition (much lower Mooney value than for composition C1).

The other compositions C2, C3 or C4 having properties that are unacceptable for the use thereof in tyres, either due to a scorch time that is much too short (C2 and C4), or due to their viscosity in the uncured state being too high (C3, the Mooney value of which is very high).

Furthermore, observation of the properties of these compositions after curing shows that the reinforcement index (M300/M100 ratio) is maintained, a clear indicator for a person skilled in the art of very good aptitude of the compositions of the invention to withstand wear, for the properties in accordance with the invention C5 and C6, compared to the control composition C1, with a significant improvement in the elongation at break. In addition, quite remarkably for the compositions C5 and C6 in accordance with the invention, compared to the control composition C1, a substantially reduced hysteresis is noted, as attested to by the values of $\tan(\delta)_{max}$ and $\Delta G^*$ which are very substantially reduced. This is a recognized indicator of a reduction in the rolling resistance of the tyres, and consequently of a reduction in the energy consumption of motor vehicles fitted with such tyres; and even more so for the composition C6 comprising both a coupling agent in accordance with the invention and a covering agent.

It may be noted that composition C4, not in accordance with the invention, also has a reduced hysteresis relative to composition C1, however this property cannot be used in this case given the very short scorch time of composition C4 which renders it unusable in tyres.

It clearly appears that a composition in accordance with the invention comprising, as coupling agent, a blocked mercaptosilane of formula (I) makes it possible to obtain properties that are equivalent, or even improved (processability, elongation at break, hysteresis) relative to the conventional control composition, without using zinc, unlike compositions comprising other coupling agents, including mercaptosilanes that are blocked but that have a different formula to that of the invention.

It may furthermore be noted that the use of a blocked mercaptosilane in accordance with the invention is particularly advantageous from the point of view of the environment. It makes it possible both to overcome the problems due to eliminating zinc and to reduce the amount of VOCs (volatile organic compounds) released, both during the manufacture of the rubber compositions themselves and during the curing of the rubber articles incorporating these compositions. Indeed, the blocked mercaptosilane in accordance with the invention has only a single alkoxy functional group per silicon atom, whereas TESPT bears three alkoxy functional groups per silicon atom; which functional groups are capable of liberating alcohols such as ethanol in the case of S-octanoylmercaptopropylethoxydimethylsilane and TESPT.

TABLE 1

| | Composition No. | | | | | |
|---|---|---|---|---|---|---|
| | C1 | C2 | C3 | C4 | C5 | C6 |
| SBR (1) | 70 | 70 | 70 | 70 | 70 | 70 |
| BR (2) | 30 | 30 | 30 | 30 | 30 | 30 |
| Silica (3) | 80 | 80 | 80 | 80 | 80 | 80 |
| coupling agent (4) | 6.4 | 6.4 | — | — | — | — |
| coupling agent (5) | — | — | 4.9 | — | — | — |
| coupling agent (6) | — | — | — | 8.9 | — | — |
| coupling agent (7) | — | — | — | — | 7.4 | 7.4 |
| silane (8) | — | — | — | — | — | 1 |
| carbon black (9) | 5 | 5 | 5 | 5 | 5 | 5 |
| MES oil (10) | 6 | 6 | 6 | 6 | 6 | 6 |
| plasticizing resin (11) | 20 | 20 | 20 | 20 | 20 | 20 |
| DPG (12) | 1.5 | 1.5 | 1.5 | 1.5 | 1.5 | 1.5 |
| anti-ozone wax (13) | 1.5 | 1.5 | 1.5 | 1.5 | 1.5 | 1.5 |
| ZnO (14) | 1.5 | — | — | — | — | — |
| antioxidant (15) | 2 | 2 | 2 | 2 | 2 | 2 |

TABLE 1-continued

| | Composition No. | | | | | |
|---|---|---|---|---|---|---|
| | C1 | C2 | C3 | C4 | C5 | C6 |
| stearic acid (16) | 2 | 2 | 2 | 2 | 2 | 2 |
| sulphur | 1 | 1 | 1 | 1 | 1 | 1 |
| accelerator (17) | 2 | 2 | 2 | 2 | 2 | 2 |

(1) SSBR with 25% of styrene, 59% of 1,2-polybutadiene units and 20% of trans-1,4-polybutadiene units ($T_g = -24°$ C.) content expressed as dry SBR (SBR extended with 9% of MES oil, i.e. a total of SSBR + oil equal to 76 phr);
(2) BR (Nd) with 0.7% of 1,2-; 1.7% of trans-1,4; 98% of cis-1,4-($T_g = -105°$ C.);
(3) "ZEOSIL 1165 MP" silica from Rhodia in the form of micropearls (BET and CTAB: around 150-160 m²/g);
(4) TESPT ("SI69" from Degussa);
(5) MESPT ("RP74" from Rhodia);
(6) S-octanoylmercaptopropyltriethoxysilane ("Silane NXT ™" from GE Silicones);
(7) S-octanoylmercaptopropylethoxydimethylsilane (synthesized product);
(8) octylmethyldihydroxysilane (synthesized product);
(9) N234 (Degussa);
(10) MES oil ("Catenex SNR" from Shell);
(11) polylimonene resin ("Dercolyte L120" from DRT);
(12) diphenylguanidine (Perkacit DPG from Flexsys);
(13) mixture of macrocrystalline and microcrystalline anti-ozone waxes;
(14) zinc oxide (industrial grade - Umicore);
(15) N-1,3-dimethylbutyl-N-phenyl-para-phenylenediamine ("Santoflex 6-PPD" from Flexsys);
(16) stearine ("Pristerene 4931" - Uniqema);
(17) N-cyclohexyl-2-benzothiazylsulphenamide ("Santocure CBS" from Flexsys).

TABLE 2

| | Composition No. | | | | | |
|---|---|---|---|---|---|---|
| | C1 | C2 | C3 | C4 | C5 | C6 |
| Properties before curing | | | | | | |
| Mooney (MU) | 92 | 93 | 100 | 73 | 75 | 69 |
| T5 (min) | 20 | 12 | 17 | 13 | 20 | 19 |
| Properties after curing | | | | | | |
| M300/M100 | 1.3 | 1.5 | 1.5 | 1.3 | 1.3 | 1.3 |
| Tensile strength (MPa) | 22.0 | 23.5 | 22.9 | 21.1 | 21.5 | 21.8 |
| Elongation at break (%) | 578 | 514 | 525 | 601 | 762 | 800 |
| ΔG* (MPa) | 5.21 | 4.56 | 3.02 | 2.69 | 2.33 | 1.80 |
| tan (δ)$_{max}$ | 0.358 | 0.360 | 0.327 | 0.305 | 0.309 | 0.288 |

The invention claimed is:

1. A rubber composition that is free of zinc or that contains less than 0.5 phr of zinc, and wherein zinc has not been replaced with another metal, which can be used for the manufacture of tires, based on at least:
   one diene elastomer;
   one sulphur-based crosslinking system;
   one inorganic filler as reinforcing filler;
   one blocked mercaptosilane of general formula I below:

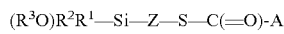
   (R³O)R²R¹—Si—Z—S—C(=O)-A wherein:
   $R^1$ and $R^2$, which are identical or different, represent a monovalent hydrocarbon-based group selected from the group consisting of alkyls, which are linear or branched, cycloalkyls or aryls, having from 1 to 18 carbon atoms;
   $R^3$ represents a monovalent hydrocarbon-based group selected from the group consisting of linear or branched alkyls having from 1 to 4 carbon atoms;
   A represents hydrogen or a monovalent hydrocarbon-based group chosen from alkyls, which are linear or branched, cycloalkyls or aryls, having from 1 to 18 carbon atoms;
   Z represents a divalent bonding group comprising from 1 to 18 carbon atoms.

2. The composition according to claim 1, wherein Z contains one or more heteroatoms chosen from O, S and N.

3. The composition according to claim 1, wherein:
   $R^1$ and $R^2$ are identical or different and are selected from the group consisting of methyl, ethyl, n-propyl and iso-propyl;
   $R^3$ is selected from the group consisting of methyl and ethyl;
   A is selected from the group consisting of alkyls having from 1 to 18 carbon atoms and the phenyl radical;
   Z is selected from the group consisting of $C_1$-$C_{18}$ alkylenes and $C_6$-$C_{12}$ arylenes.

4. The composition according to claim 3, wherein Z is selected from the group consisting of $C_1$-$C_{10}$ alkylenes.

5. The composition according to claim 4, wherein Z is selected from the group consisting of $C_1$-$C_4$ alkylenes.

6. The composition according to claim 3, wherein $R^1$ and $R^2$ are each methyl.

7. The composition according to claim 3, wherein A is selected from the group consisting of alkyls having from 1 to 7 carbon atoms and the phenyl radical.

8. The composition according to claim 3, wherein $R^1$ and $R^2$ are each methyl, A is a heptyl, $R^3$ is ethyl and Z is a propylene.

9. The composition according to claim 1, wherein the diene elastomer is selected from the group consisting of polybutadienes, synthetic polyisoprenes, natural rubber, butadiene copolymers, isoprene copolymers and mixtures of these elastomers.

10. The composition according to claim 1, wherein the reinforcing inorganic filler is the predominant reinforcing filler.

11. The composition according to claim 1, wherein the reinforcing inorganic filler is a siliceous or aluminous filler.

12. The composition according to claim 1, wherein the reinforcing inorganic filler is present in an amount greater than 50 phr.

13. The composition according to claim 1, wherein the blocked mercaptosilane is present in an amount between 2% and 20% by weight relative to the amount of reinforcing inorganic filler.

14. The composition according to claim 1, wherein the blocked mercaptosilane is present in an amount between 2 and 15 phr.

15. A process for preparing a rubber composition that is free of zinc or that contains less than 0.5 phr of zinc, and wherein zinc has not been replaced with another metal, comprising, incorporating at least, by kneading, into at least (i) one diene elastomer, (ii) an inorganic filler as reinforcing filler, (iii) a blocked mercaptosilane of general formula I below:

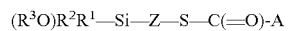
(R³O)R²R¹—Si—Z—S—C(=O)-A in which:
   $R^1$ and $R^2$, which are identical or different, represent a monovalent hydrocarbon-based group chosen from alkyls, which are linear or branched, cycloalkyls or aryls, having from 1 to 18 carbon atoms;
   $R^3$ represents a monovalent hydrocarbon-based group chosen from linear or branched alkyls having from 1 to 4 carbon atoms;
   A represents hydrogen or a monovalent hydrocarbon-based group chosen from alkyls, which are linear or branched, cycloalkyls or aryls, having from 1 to 18 carbon atoms;

Z represents a divalent bonding group comprising from 1 to 18 carbon atoms, and (iv) a sulphur-based vulcanization system.

16. Process according to claim 15, wherein it comprises the following steps:

in a first phase, incorporating into the diene elastomer, in a mixer, the reinforcing filler and the blocked mercaptosilane by thermomechanically kneading all the ingredients, one or more times, until a maximum temperature between 130° C. and 200° C. is reached;

cooling the mixture down to a temperature below 100° C.;

then, in a second phase, incorporating: the vulcanization system;

kneading everything up to a maximum temperature below 120° C.; and extruding or calendering the rubber composition thus obtained.

17. Process according to claim 16, in which a covering agent is introduced completely or partly during the first phase.

18. Process according to claim 16, in which a covering agent is introduced completely or partly during the second phase.

19. Tire or semi-finished product comprising a rubber composition according to claim 1.

20. Tire tread comprising a rubber composition according to claim 1.

21. The composition according to claim 12, wherein the reinforcing inorganic filler is present in an amount between 60 and 140 phr.

22. The composition according to claim 13, wherein the blocked mercaptosilane is present in an amount between 2% and 15% by weight relative to the amount of reinforcing organic filler.

23. The composition according to claim 14, wherein the blocked mercaptosilane is present in an amount between 4 and 12 phr.

24. The composition according to claim 3, wherein $R^1$ and $R^2$ are identical or different and are selected from the group consisting of methyl and ethyl.

* * * * *